United States Patent
Osterhoff et al.

(10) Patent No.: US 10,086,766 B2
(45) Date of Patent: Oct. 2, 2018

(54) STRUCTURAL COMPOSITE SEAT CUSHION FRAME AND STORAGE LID WITH LOCKABLE LATCH SYSTEM

(71) Applicant: Ford Global Technologies, LLC, Dearborn, MI (US)

(72) Inventors: Daniel Jay Osterhoff, Northville, MI (US); Raghavan Setlur, West Bloomfield, MI (US); Derek Williams, Grosse Ile, MI (US); Arthur Beneventi, Warren, MI (US); Murtatha Zalzala, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/251,693

(22) Filed: Aug. 30, 2016

(65) Prior Publication Data

US 2018/0056882 A1  Mar. 1, 2018

(51) Int. Cl.
*B60N 2/68* (2006.01)
*B60R 7/00* (2006.01)
*B60N 3/10* (2006.01)

(52) U.S. Cl.
CPC .................. *B60R 7/00* (2013.01); *B60N 2/68* (2013.01); *B60N 3/102* (2013.01)

(58) Field of Classification Search
CPC .............. B60R 7/00; B60N 2/68; B60N 3/102
See application file for complete search history.

(56) References Cited

U.S. PATENT DOCUMENTS

| 3,099,482 A | 7/1963 | Woodruff, Sr. |
| 3,848,925 A | 11/1974 | Harder |
| 3,861,747 A | 1/1975 | Diamond |
| 4,065,182 A | 12/1977 | Braniff |
| 4,717,202 A | 1/1988 | Batchelder, III et al. |

(Continued)

FOREIGN PATENT DOCUMENTS

| DE | 102010021744 A1 | 12/2011 |
| EP | 1564067 A1 | 8/2005 |

OTHER PUBLICATIONS

"Innovation Seat Tray," http://www.marutiwagonr.com/, Nov. 27, 2012 (1 page).

(Continued)

*Primary Examiner* — Philip F Gabler
(74) *Attorney, Agent, or Firm* — Vichit Chea; Price Heneveld LLP

(57) ABSTRACT

A seating assembly includes a seatback frame having first and second pivot apertures defined on an inside surface of first and second side members, respectively, of the seatback frame. A seat includes a cushion assembly supported on a polymeric seat storage lid having a rear vertical wall and a forward lateral body. The forward lateral body is defined by a plurality of upwardly-opening support cells. First and second metal pivot pins extend from first and second sides of the rear vertical wall of the seat storage lid and engage such that a seat is operable between open and closed positions. A forward rounded hump is detachably coupled with a top surface of the seat storage lid. The forward rounded hump is configured to lessen the potential of an occupant to slide forward in the seat. A lock is operably coupled with the seat storage lid.

20 Claims, 11 Drawing Sheets

(56) References Cited

U.S. PATENT DOCUMENTS

| | | | |
|---|---|---|---|
| 4,746,168 A | 5/1988 | Bracesco | |
| 4,871,209 A | 10/1989 | Handelman | |
| 5,263,763 A | 11/1993 | Billette | |
| 5,318,346 A | 6/1994 | Roossien et al. | |
| 5,333,934 A | 8/1994 | Knoblock | |
| 5,352,022 A | 10/1994 | Knoblock | |
| 5,462,339 A | 10/1995 | Schmale et al. | |
| 5,487,591 A | 1/1996 | Knoblock | |
| 5,542,747 A | 8/1996 | Burchi | |
| 5,611,598 A | 3/1997 | Knoblock | |
| 5,720,514 A | 2/1998 | Carlsen et al. | |
| 5,816,650 A | 10/1998 | Lucas | |
| 5,839,782 A * | 11/1998 | Kashiwamura | B60N 2/502 297/216.1 |
| 5,857,750 A | 1/1999 | Kashiwamura et al. | |
| 5,902,009 A * | 5/1999 | Singh | B60R 7/043 296/37.15 |
| 5,957,521 A | 9/1999 | Schlachter et al. | |
| 6,010,195 A | 1/2000 | Masters et al. | |
| 6,070,939 A | 6/2000 | Matsuo et al. | |
| 6,102,463 A | 8/2000 | Swanson et al. | |
| 6,106,044 A | 8/2000 | Schlachter | |
| 6,106,071 A | 8/2000 | Aebischer et al. | |
| 6,139,096 A | 10/2000 | Anderson et al. | |
| 6,161,896 A | 12/2000 | Johnson et al. | |
| 6,168,239 B1 * | 1/2001 | Conner | A47C 3/12 297/452.1 |
| 6,199,252 B1 | 3/2001 | Masters et al. | |
| 6,361,239 B1 * | 3/2002 | Parikh | B60N 2/682 297/15 |
| 6,419,313 B1 * | 7/2002 | Newman | B60N 2/70 296/37.15 |
| 6,869,121 B2 | 3/2005 | Kayumi et al. | |
| 6,877,807 B2 | 4/2005 | Mizuno et al. | |
| 7,128,373 B2 | 10/2006 | Kurtycz et al. | |
| 7,252,341 B2 | 8/2007 | Kircher et al. | |
| 7,523,985 B2 | 4/2009 | Bhatia et al. | |
| 7,562,931 B2 | 7/2009 | Stojanovic | |
| 7,677,656 B2 | 3/2010 | Saberan et al. | |
| 7,806,476 B2 | 10/2010 | Forgatsch et al. | |
| 7,819,468 B2 | 10/2010 | Tsuda et al. | |
| 7,862,097 B2 | 1/2011 | Maceri et al. | |
| 7,883,146 B2 | 2/2011 | Saberan et al. | |
| 7,891,740 B2 | 2/2011 | Boes | |
| 8,397,963 B2 | 3/2013 | Singh | |
| 8,540,318 B2 | 9/2013 | Folkert et al. | |
| 8,602,501 B2 | 12/2013 | Walker et al. | |
| 8,770,661 B2 | 7/2014 | Kalergis et al. | |
| 8,985,685 B2 | 3/2015 | Line et al. | |
| 2002/0005649 A1 | 1/2002 | Hofmann | |
| 2004/0195897 A1 | 10/2004 | Mitjans | |
| 2009/0195035 A1 | 8/2009 | Ripley et al. | |
| 2010/0171346 A1 | 7/2010 | Laframboise et al. | |
| 2010/0327647 A1 | 12/2010 | Galbreath et al. | |
| 2011/0148173 A1 | 6/2011 | Westerink et al. | |
| 2011/0316320 A1 | 12/2011 | Kulkarni et al. | |
| 2012/0267935 A1 | 10/2012 | Zekavica et al. | |
| 2013/0313869 A1 | 11/2013 | Aguirre et al. | |
| 2014/0225403 A1 | 8/2014 | Shimada et al. | |
| 2016/0114732 A1 * | 4/2016 | Sawada | B60R 7/04 224/400 |

OTHER PUBLICATIONS

"Under Seat Storage," http://www.accuride-europe.com/Case-Studies/Automotive/Under-Seat-Storage-For-Cars, Nov. 27, 2012 (1 page).

"Mazda 5," http://ww.caranddriver.com/photos-10q1/322734/2011-mazda-5-middle-row-under-seat-storage-photo-333375, Nov. 27, 2012 (2 pages).

Thryft, Ann R., "'Performance' Car Seat Eliminates Steel," Design-News, Jan. 30, 2012, http://www.designnews.com/document.asp?doc_id=237504&print=yes (3 pages).

Composites Manufacturing Online, "New Composite Car Seat for Midmarket Vehicles," Feb. 4, 2012, http://www.compositesmanufacturingblog.com/2012/02/new-composite-car-seat-for-midmarket-vehicles (1 page).

* cited by examiner

STRUCTURAL COMPOSITE SEAT CUSHION FRAME AND STORAGE LID WITH LOCKABLE LATCH SYSTEM

FIELD OF THE DISCLOSURE

The present disclosure generally relates to a seating assembly, and more particularly to a structural composite seat cushion frame and storage lid with a lockable latch system for a seating assembly.

BACKGROUND OF THE DISCLOSURE

Seating assemblies typically include a seatback to support a back of an occupant in an upright sitting position and various reclined positions. Similar to other portions of a seating assembly, seatbacks are commonly designed to support an occupant in the upright sitting position upon acceleration, change in direction, and collision of the vehicle. Accordingly, seatbacks are substantially rigid and sizeable in construction.

Traditional vehicle seating has frequently included a seat frame that supports a matrix of springs that support a thick cushion thereon. Newer constructions having climate control features add to the bulk. These constructions are generally very thick and heavy, which result in decreased interior space in a vehicle, as well as loss of fuel efficiency as a result of the added weight of the seating system.

SUMMARY OF THE DISCLOSURE

According to one aspect of the present disclosure, a seating assembly includes a seatback frame having first and second pivot apertures defined on an inside surface of first and second side members, respectively, of the seatback frame. A seat includes a cushion assembly supported on a polymeric seat storage lid having a rear vertical wall and a forward lateral body. The forward lateral body is defined by a plurality of upwardly-opening support cells. First and second metal pivot pins extend from first and second sides of the rear vertical wall of the seat storage lid and engage such that a seat is operable between open and closed positions. A forward rounded hump is detachably coupled with a top surface of the seat storage lid. The forward rounded hump is configured to lessen the potential of an occupant to slide forward in the seat. A lock is operably coupled with the seat storage lid.

According to another aspect of the present disclosure, a seating assembly includes a seatback frame having first and second side members. A seat includes a lockable polymeric seat storage lid operable between open and closed positions and defined by a plurality of upwardly-opening support cells. Metallic pivot pins extend from the seat storage lid and engage the first and second side members. A forward rounded hump is detachably coupled with a top surface of the seat storage lid.

According to yet another aspect of the present disclosure, a seating assembly includes a seatback frame. A latchable and lockable polymeric seat storage lid includes a rear vertical wall and a forward lateral body, each of which includes a plurality of upwardly-opening support cells. A forward rounded hump is detachably coupled with a top surface of the seat storage lid. The forward rounded hump is configured to lessen the potential of an occupant to slide forward in a seat.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
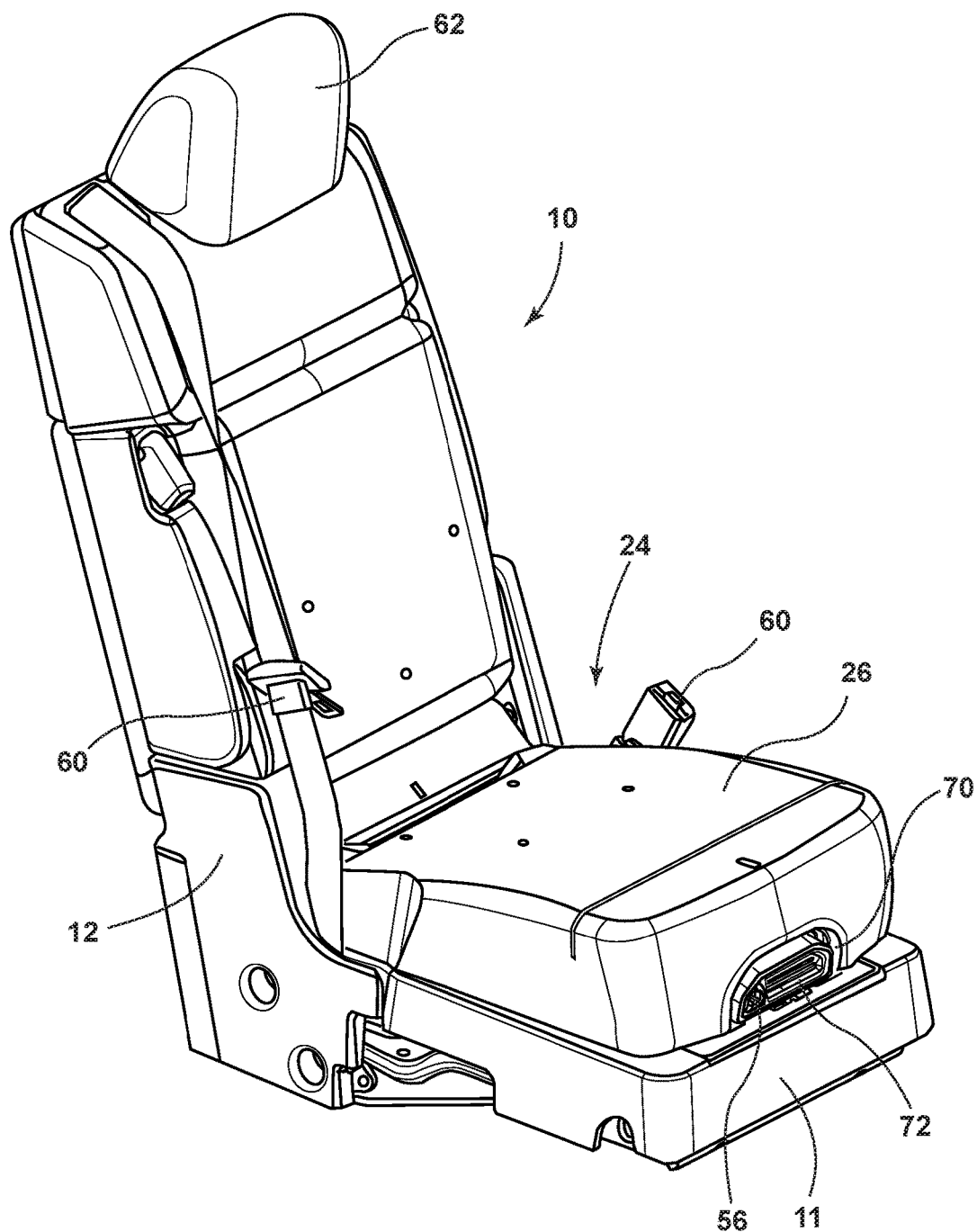
FIG. 1 is a front perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-10, reference numeral 10 generally designates a seating assembly including a seat base 11 coupled with a seatback frame 12 having first and second pivot apertures 14, 16 defined on an inside surface of first and second side members 20, 22, respectively, of the seatback frame 12. A seat 24 includes a cushion assembly 26 supported on a polymeric seat storage lid 28 having a rear vertical wall 30 and a forward lateral body 32. The polymeric seat storage lid 28 includes a peripheral rim configured to engage the cushion assembly 26. The forward lateral body 32 is defined by a plurality of upwardly-opening support cells 34. First and second metal pivot pins 36, 38 extend from a top edge of first and second sides of the rear vertical wall 30 of the seat storage lid 28 and engage such that the seat 24 is operable between open and closed positions. A forward rounded hump 52 is detachably coupled with a top surface of the seat storage lid 28 via a snap-fit engagement. The forward rounded hump 52 has a generally smooth top surface and is configured to lessen the potential of an occupant to slide forward in the seat 24. A lock 56 is operably coupled with the seat storage lid 28.

With reference again to FIG. 1, the illustrated seating assembly 10 includes a narrow construction that can be used in a 40/20/40 seating arrangement, or a 20/40/40 seating arrangement. Accordingly, it will be understood that many of the features and functions of the seating assembly 10 as set forth herein may differ slightly from larger seating systems configured to fully support the back and sides of an occupant. Regardless, the seating assembly 10 includes many features that are present in most seating assemblies, including a seatbelt 60, or seat harness, as well as a head restraint 62. In addition, it will generally be understood that the seating assembly 10 may be positioned over a rail and slide assembly for fore and aft movement within a vehicle.

Figure 2:
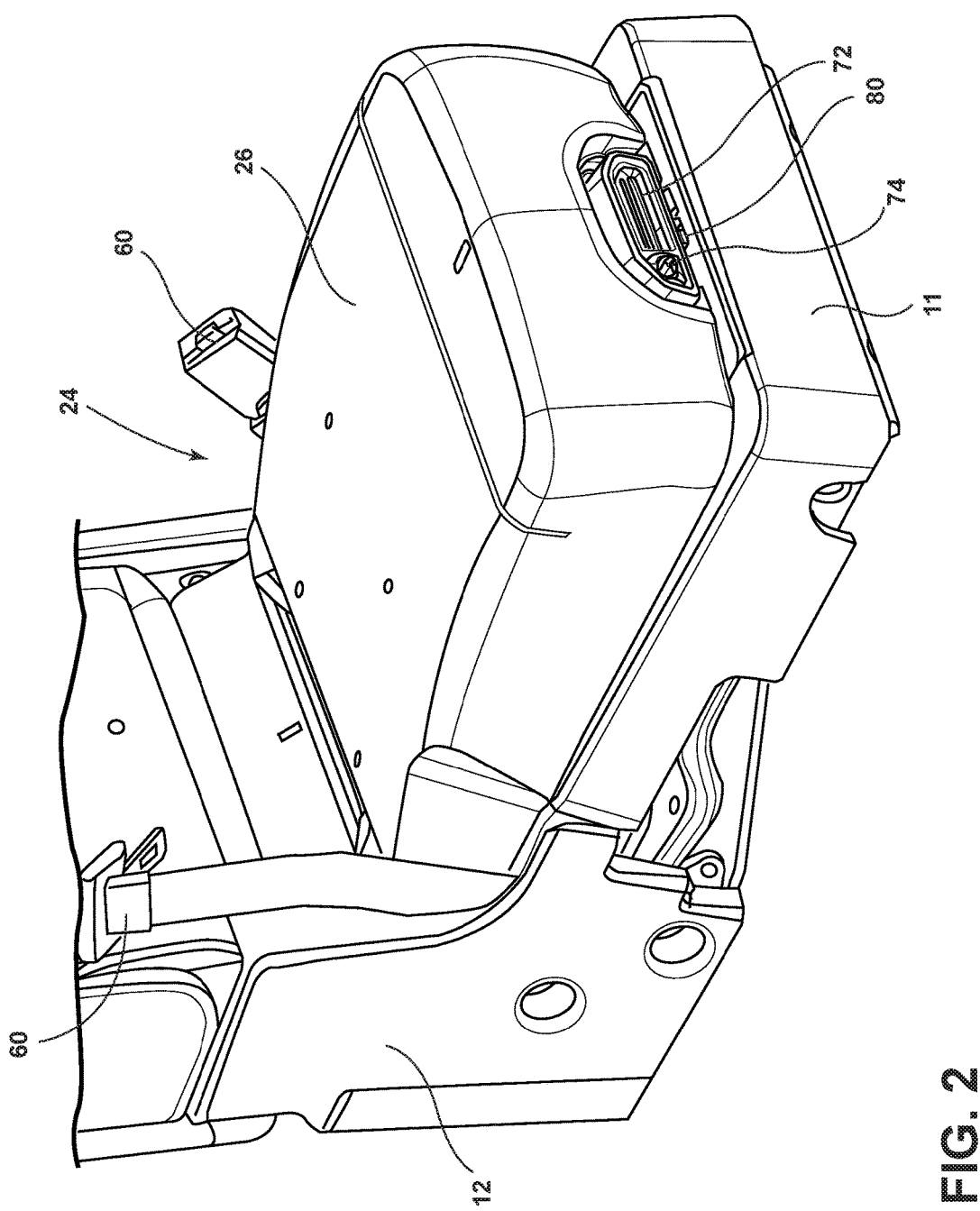
FIG. 2 is a top front perspective view of a seating assembly of the present disclosure.
Figure 2A:
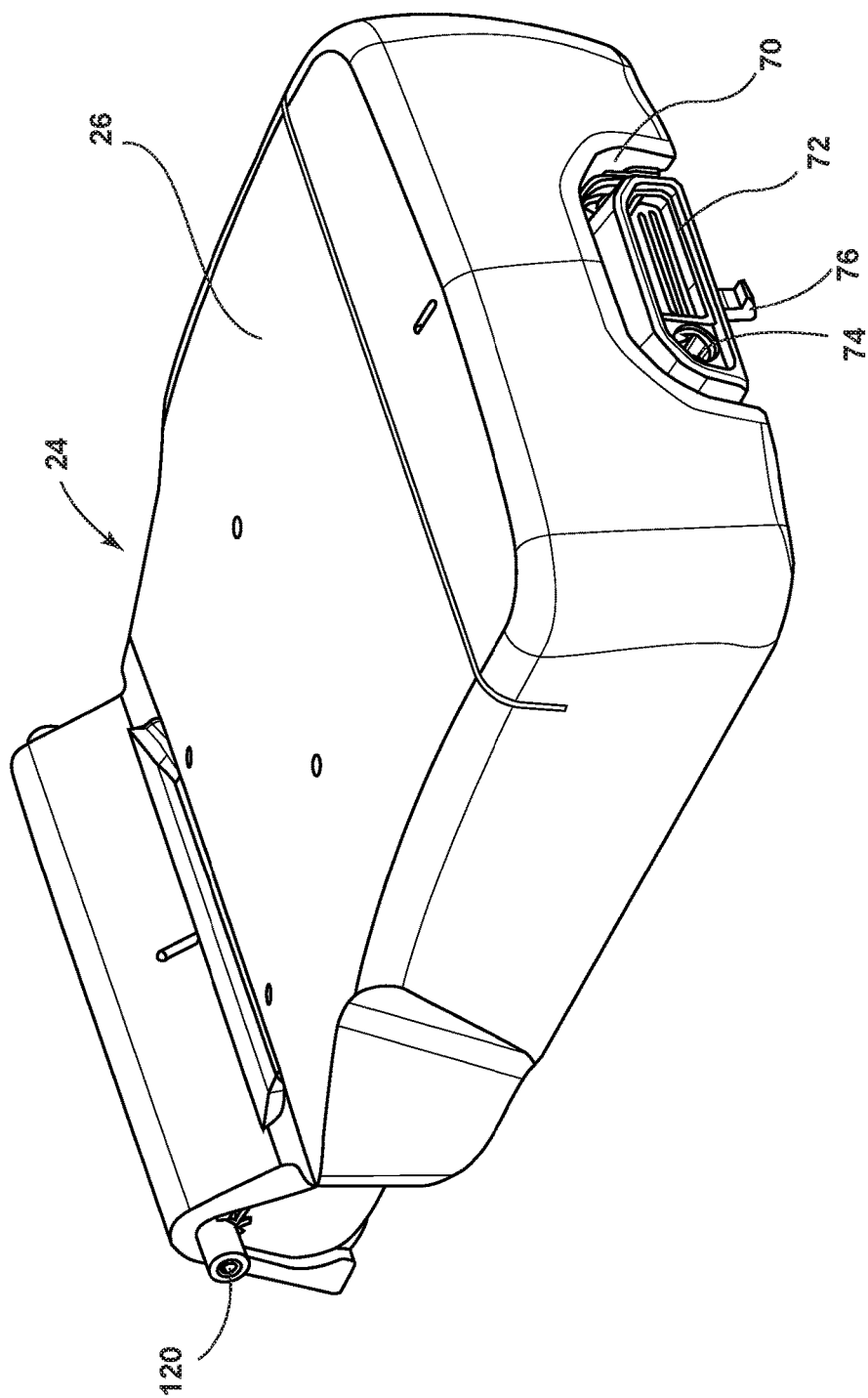
FIG. 2A is a front top perspective view of a seat portion of the seating assembly of FIG. 2.

With reference again to FIGS. 1 and 2, the cushion assembly 26 that extends over the seat 24 includes a forward aperture 70 configured to accommodate an actuator in the form of a handle 72. The handle 72 includes a latch 74 that is operable between a latched condition and an unlatched condition. The latch 74 includes a latch bolt 76 that extends downwardly from the latch 74 and which is configured to engage a striker 75 disposed in the seat base 11. Actuation of the latch 74 in the handle 72 moves the latch bolt 76 between latched and unlatched positions. When the seat storage lid 28 is in the closed position and the latch 74 of the handle 72 is in the latch position, the seat storage lid 28 is maintained in a secure downward position. However, an occupant may actuate the latch 74 of the handle 72, thereby moving the latch 74 to the unlatched position, resulting in the ability to move the seat storage lid 28 to a raised or open position. When the seat storage lid 28 is moved to the open position, the seat storage lid 28 rotates about the first and second metal pivot pins 36, 38 that extend from the first and second sides of the rear vertical wall 30 of the seat storage lid 28 (FIG. 2A). The first and second metal pivot pins 36, 38 are generally disposed in a position above a seating surface of the seat 24. Consequently, the seat storage lid 28 can be moved a greater distance out of the way so that access to a storage bin 80 below the seat storage lid 28 is more accessible.

Figure 3:
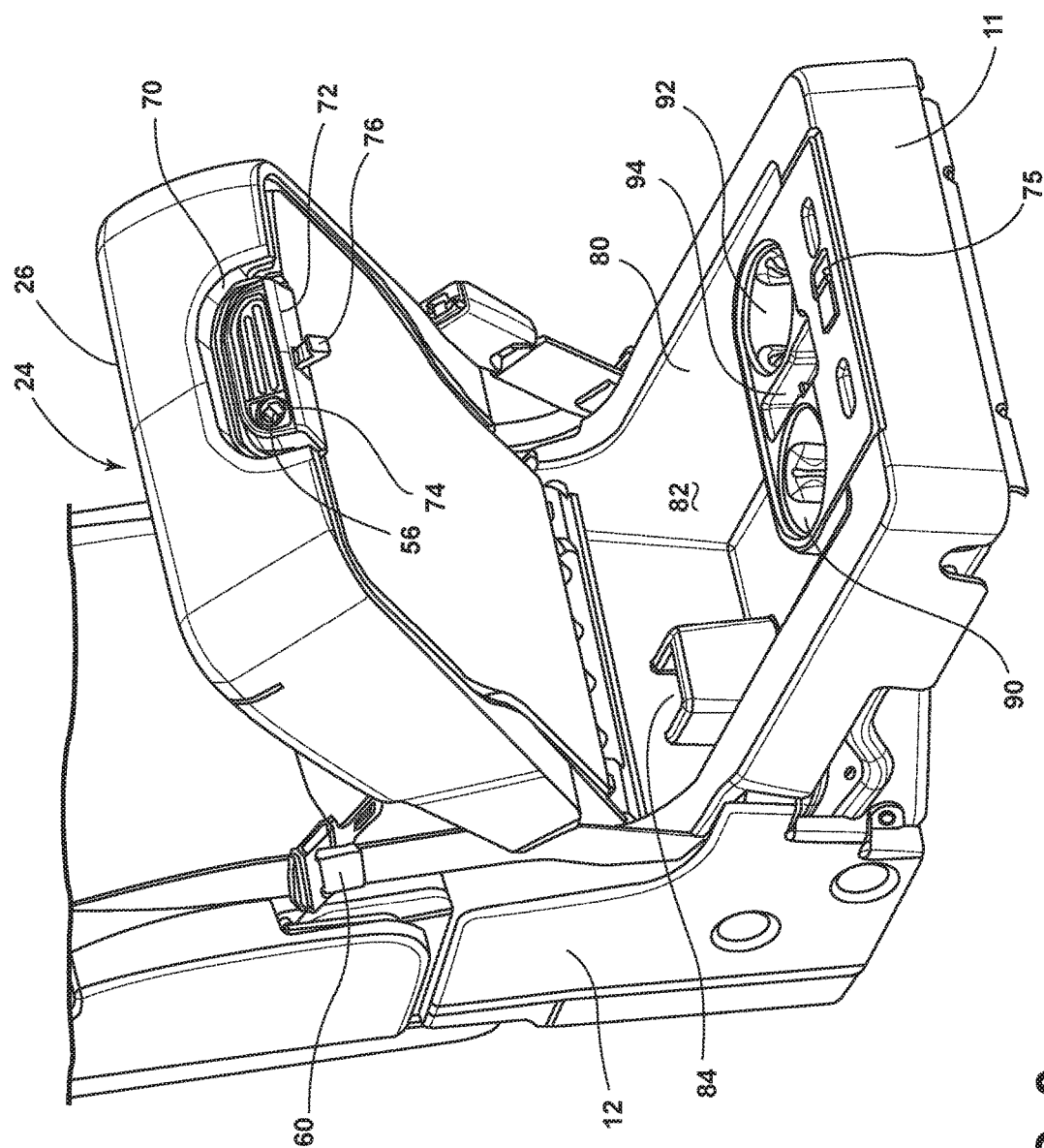
FIG. 3 is a front top perspective view of the seat portion of the seating assembly of FIG. 1 with the seat storage lid in an open position.

With reference to FIG. 3, the seat storage lid 28 is shown in an open position. The storage bin 80, as illustrated, includes a large storage area 82, as well as a rear smaller storage area 84 for stowing smaller objects, such as keys or a phone. A forward portion of the storage bin 80 includes first and second cup holders 90, 92 and a central storage area 94 for storing other small objects, such as keys, a phone, credit cards, etc. It will be generally understood that the cup holder assembly could be removed to provide a greater storage area below the seat storage lid 28.

Figure 4:
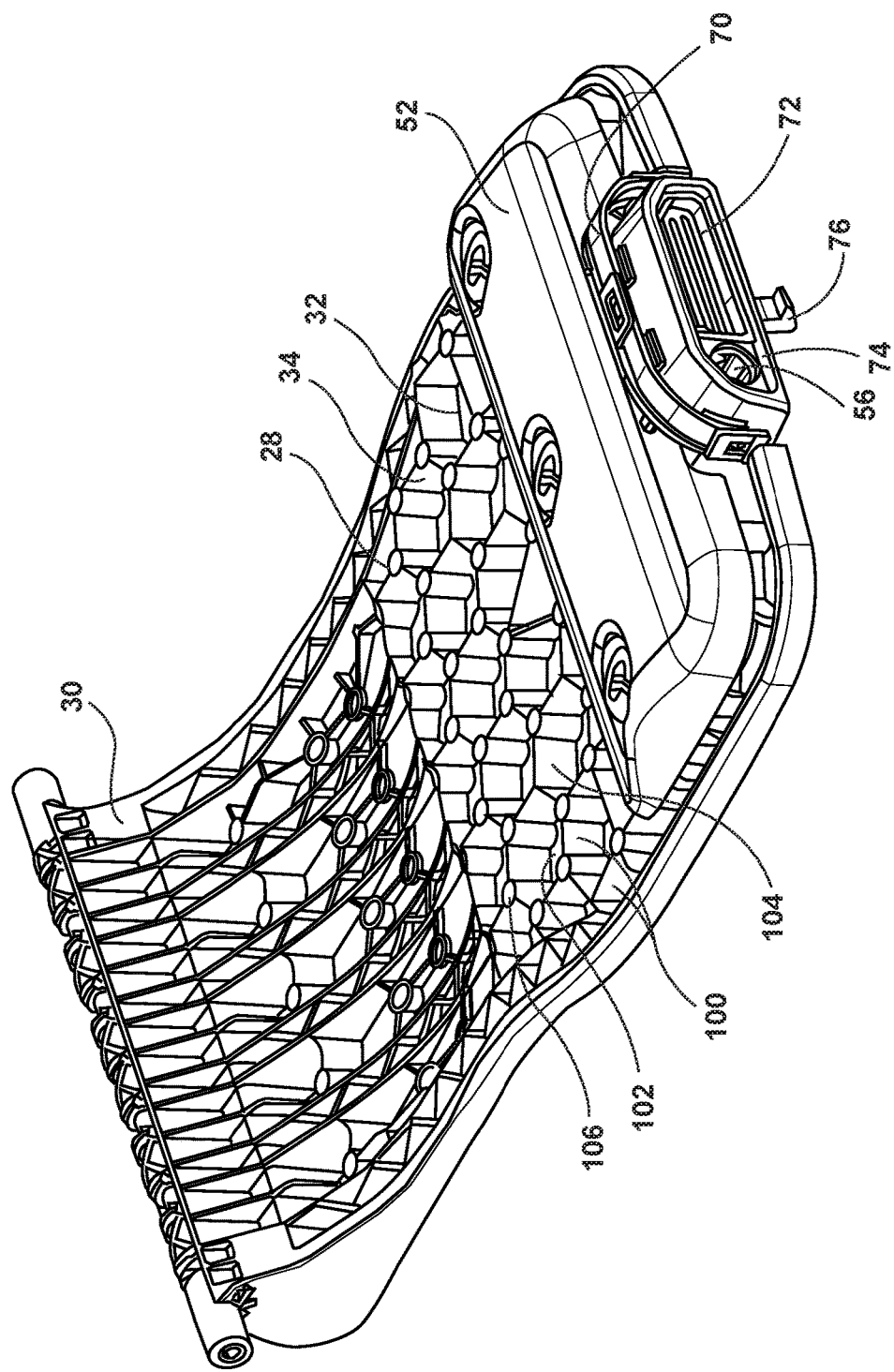
FIG. 4 is a top perspective view of a seat storage lid of the present disclosure with cushion removed.
Figure 7:
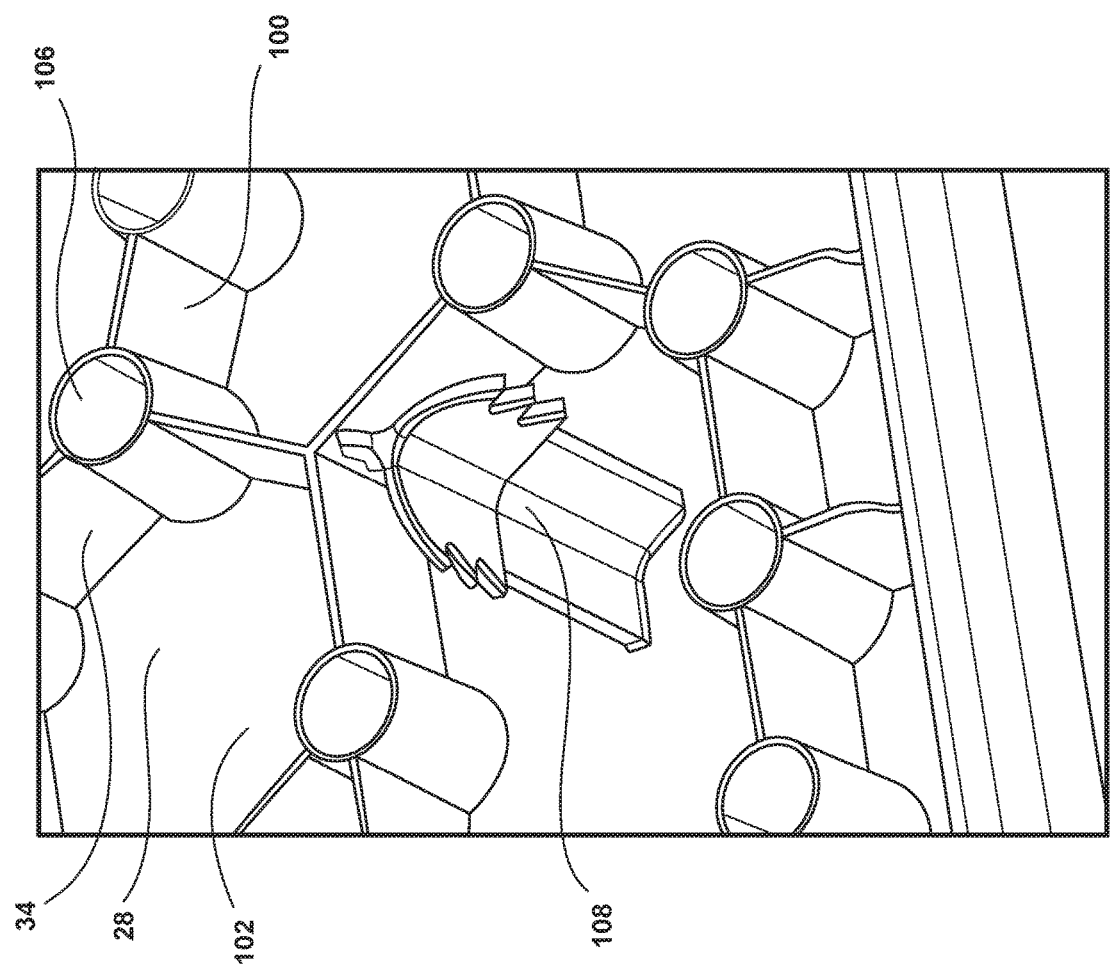
FIG. 7 is a top perspective view of one embodiment of a connecting device for an anti-submarining feature of one embodiment of a storage lid of the present disclosure.

As illustrated in the embodiment shown in FIG. 4, the seat storage lid 28 includes a polymeric construction with a matrix of vertically oriented walls 100. The vertically oriented walls 100 define a plurality of upwardly opening support cells 102. The plurality of upwardly opening support cells 102 include large upwardly opening support cells 104 and a plurality of small upwardly opening support cells 106. In addition, a forward portion of the storage lid 28 includes fasteners 108 configured to engage receiving apertures 109 and the forward rounded hump 52, which may be constructed from a foam or other pliable material. The fasteners 108, as shown in FIG. 7, include a plurality of barbed hooks configured to engage the forward rounded hump 52, which acts as an anti-submarining ramp, and securely position the forward rounded hump 52 in abutting contact above the seat storage lid 28. The forward rounded hump 52 is disposed directly behind the handle 72 and locking latch system of the seat storage lid 28.

Figure 5:
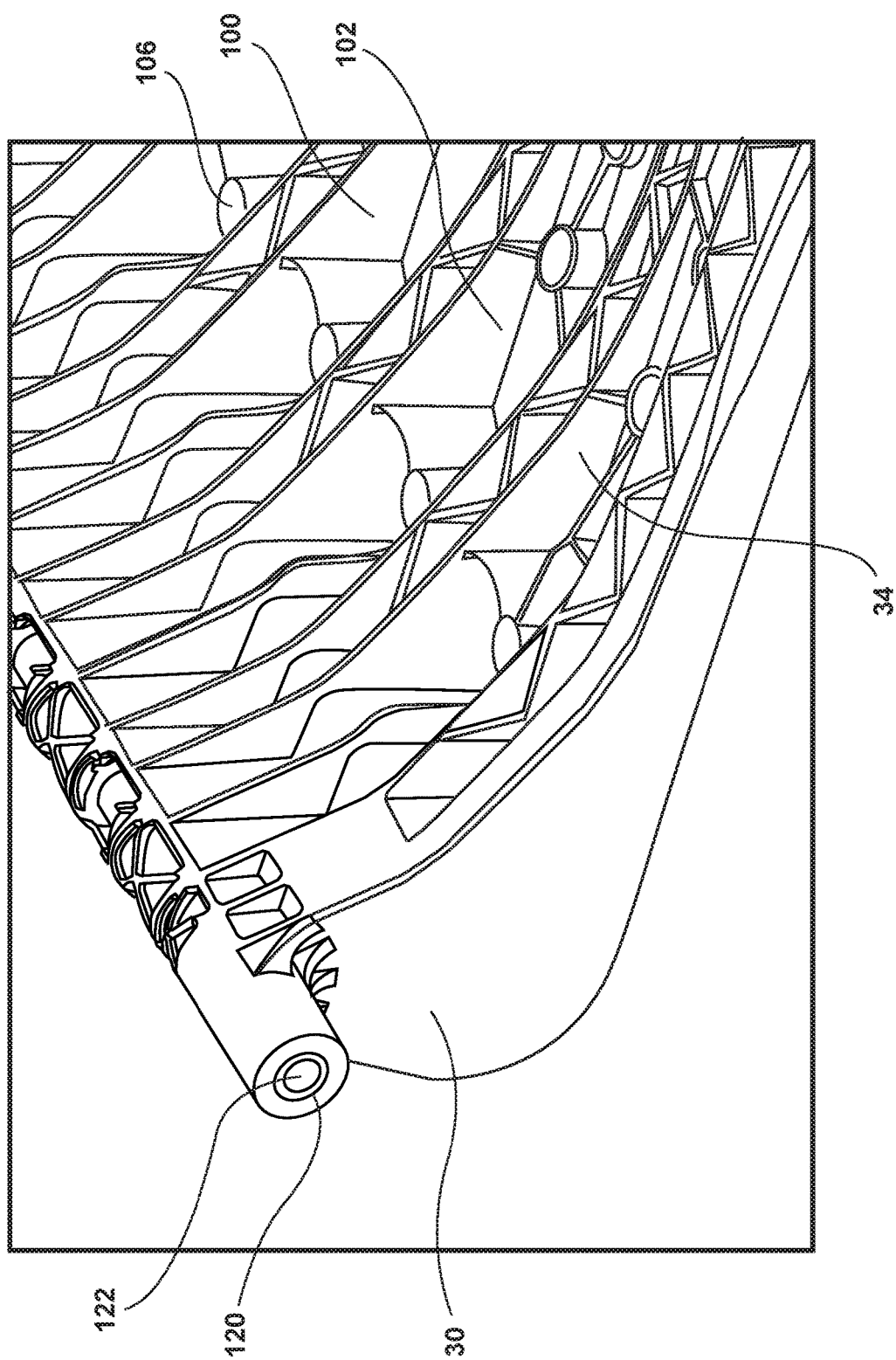
FIG. 5 is an enlarged top perspective view of a rear vertical wall of one embodiment of a seat storage lid of the present disclosure.
Figure 6:
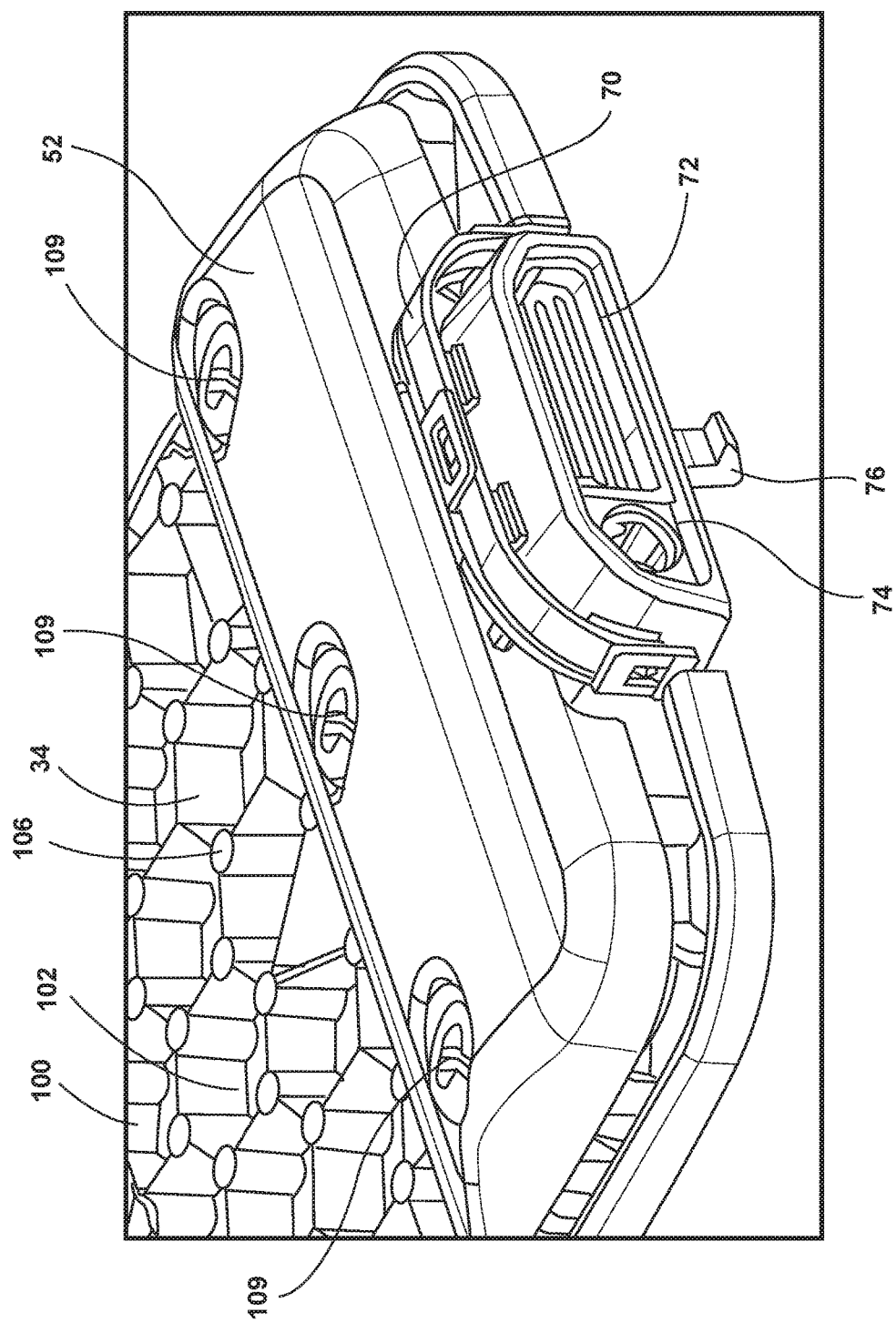
FIG. 6 is an enlarged front perspective view of a front portion of one embodiment of a seat storage lid of the present disclosure with the cushion removed.

With reference now to FIG. 5, a rear portion of the seat storage lid 28 includes the rear wall 30. A top portion of the rear wall 30 includes the pivot pins 36, 38 that are disposed inside a metallic tubular receiver 120. The metallic tubular receiver 120 is configured to receive the pivot pins 36, 38 via a threaded engagement such that the seat storage lid 28 can rotate about the metallic tubular receiver 120 between open and closed positions.

Figure 8:
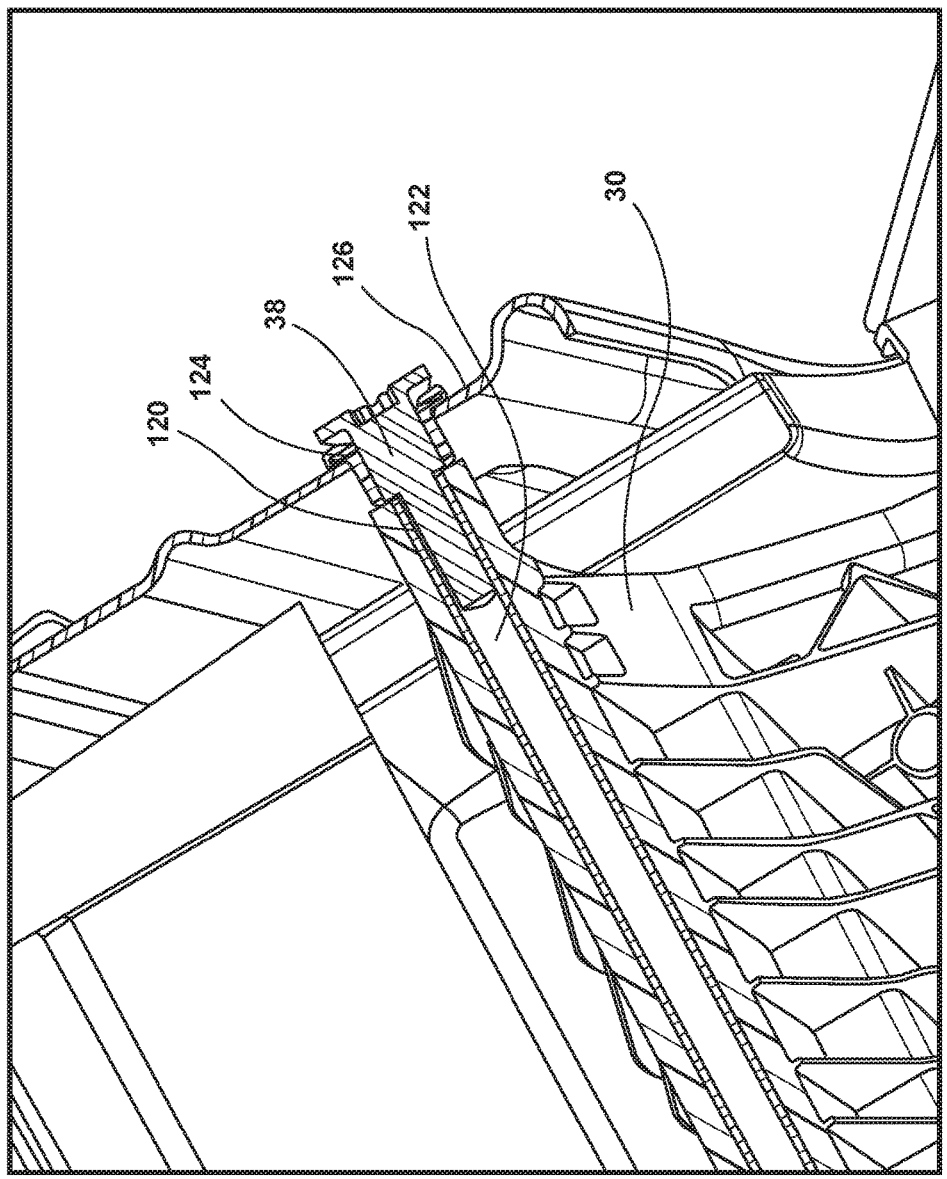
FIG. 8 is a top perspective cross-sectional view of the rear wall of a storage lid of the present disclosure illustrating the pivot pin of the seat storage lid.
Figure 9:
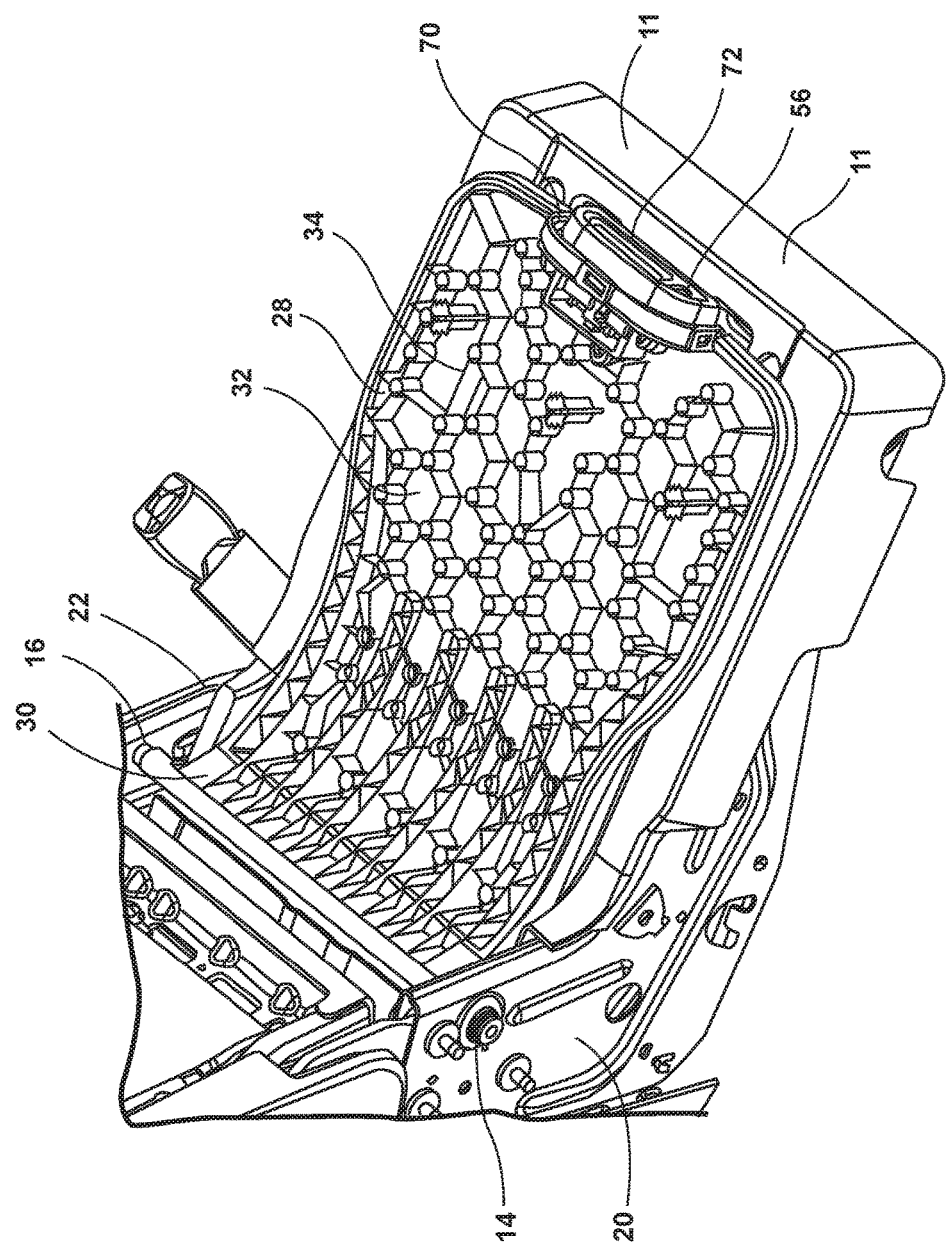
FIG. 9 is a top perspective view of one embodiment of a seat storage lid with the cushion removed prior to closure.
Figure 10:
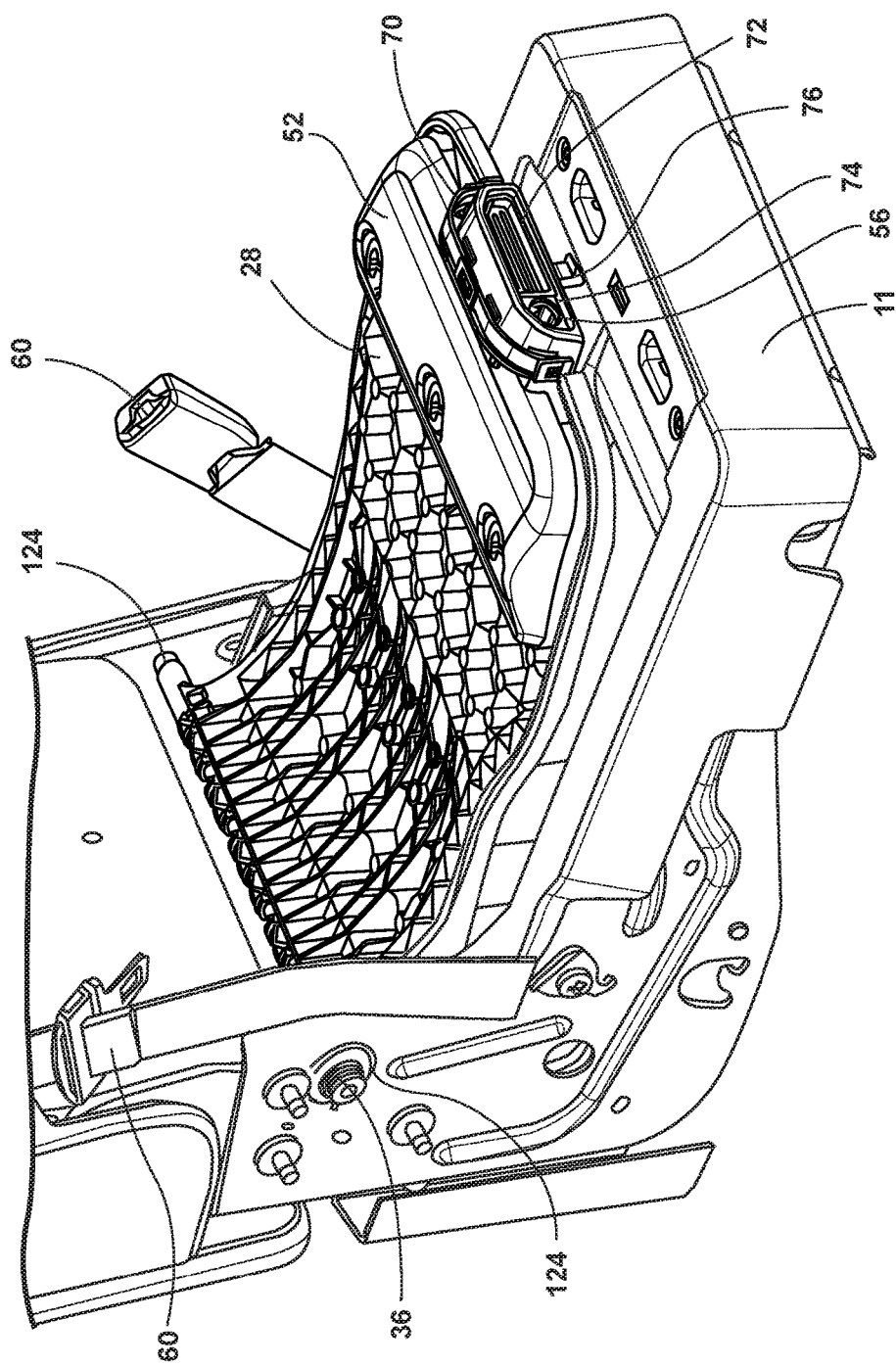
FIG. 10 is a front perspective view of a seat storage lid of the present disclosure with the seat storage lid in a closed position.

With reference now to FIG. 8, the pivot pin 38 is clearly illustrated in threaded position relative to the metallic tubular receiver 120, which is disposed inside an elongate aperture 122 defined through a topmost portion of the rear wall 30. The pivot pins 36, 38 are disposed within bushings 124 that are supported within a steel bracket 126 of the first and second side members 20, 22 of the seat 24. The pivot pins 36, 38 are configured to rotate with the metallic tubular receiver 120 within the bushings 124. The bushings 124 are likely made from a powder or formed metal. And lubricated between the bushings 124 and the pivot pins 36, 38. Although only the pivot pin 38 is illustrated in FIG. 8, it will be understood that the pivot pin 36 operates in a similar fashion with a mirror image construction on the other side of the seat 24.

The aforementioned structure is generally configured to allow for a storage area to be concealed within a vehicle in a small narrow seat. A composite architecture of the seat storage lid allows for a lightweight component yet robust and strong to support the weight of an occupant. In addition, the seat storage lid includes a handle with a locking latch system so that items may be securely stored within the storage bin.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seatback frame having first and second pivot apertures defined on an inside surface of first and second side members, respectively, of the seatback frame;
   a seat including a cushion assembly supported on a polymeric seat storage lid including a rear vertical wall and a forward lateral body, the forward lateral body defined by a plurality of upwardly-opening support cells;
   first and second metal pivot pins extending from first and second sides of the rear vertical wall of the seat storage lid above the upwardly-opening support walls and engaging the seatback frame such that a seat is operable between open and closed positions;
   a forwardly mounted rounded hump detachably coupled with a top surface of the seat storage lid, the forward rounded hump configured to lessen the potential of an occupant to slide forward in the seat; and
   a lock operably coupled with the seat storage lid.

2. The seating assembly of claim 1, wherein the forward rounded hump is coupled with the top surface of the seat storage lid via a snap-fit engagement.

3. The seating assembly of claim 1, wherein the forward rounded hump includes a generally smooth top surface.

4. The seating assembly of claim 1, wherein the polymeric seat storage lid includes a peripheral rim configured to engage the cushion assembly.

5. The seating assembly of claim 1, wherein the first and second metal pivot pins extend from a top edge of the first and second sides of the rear vertical wall.

6. The seating assembly of claim 1, wherein the plurality of upwardly-opening support cells include a plurality of large upwardly-opening support cells and a plurality of small upwardly-opening support cells.

7. The seating assembly of claim 1, wherein the first and second metal pivot pins are threaded into a metallic tubular receiver extending across the seat storage lid.

8. The seating assembly of claim 7, wherein the first and second metal pivot pins are supported in a bushing extending through a steel bracket of the seat.

9. A seating assembly comprising:
   a seatback frame having first and second side members;
   a seat including a lockable polymeric seat storage lid operable between open and closed positions and defined by a plurality of upwardly-opening support cells;
   metallic pivot pins extending from the seat storage lid and engaging the first and second side members;
   a hump detachably coupled with a forward portion of a top surface of the seat storage lid.

10. The seating assembly of claim 9, wherein the forward rounded hump is coupled with the top surface of the seat storage lid via a snap-fit engagement.

11. The seating assembly of claim 9, wherein the forward rounded hump includes a generally smooth top surface.

12. The seating assembly of claim 9, wherein the lockable polymeric seat storage lid includes a peripheral rim configured to engage a cushion assembly.

13. The seating assembly of claim 9, wherein the metallic pivot pins extend from a top edge of first and second sides of the lockable polymeric seat storage lid.

14. The seating assembly of claim 9, wherein the lockable polymeric seat storage lid includes a forward lateral body and a rear vertical wall, and wherein both the rear vertical wall and the forward lateral body include the plurality of upwardly-opening support cells.

15. A seating assembly comprising:
   a seatback frame;
   a latchable and lockable polymeric seat storage lid including a rear vertical wall and a forward lateral body, each of which includes a plurality of upwardly-opening support cells; and
   a rounded hump operably coupled with a forward portion of a top surface of the seat storage lid, the forward rounded hump configured to lessen the potential of an occupant to slide forward in a seat.

16. The seating assembly of claim 15, wherein the forward rounded hump is coupled with a top surface of the latchable and lockable seat storage lid via a snap-fit engagement.

17. The seating assembly of claim 15, wherein the forward rounded hump includes a generally smooth top surface.

18. The seating assembly of claim 15, wherein the latchable and lockable polymeric seat storage lid includes a peripheral rim configured to engage a cushion assembly.

19. The seating assembly of claim 15, further comprising:
first and second metal pivot pins extending from a top edge of first and second sides of the rear vertical wall.

20. The seating assembly of claim 15, wherein the plurality of upwardly-opening support cells include a plurality of large upwardly-opening support cells and a plurality of small upwardly-opening support cells.

* * * * *